(12) United States Patent
Liu et al.

(10) Patent No.: US 12,405,396 B2
(45) Date of Patent: Sep. 2, 2025

(54) HOLOGRAPHIC INVERSION FOR HYDROCARBON INDICATOR

(71) Applicant: SAUDI ARABIAN OIL COMPANY, Dhahran (SA)

(72) Inventors: Lu Liu, Beijing (CN); Fuhao Qin, Dhahran (SA); Yi Luo, Dhahran (SA); Yubing Li, Beijing (CN)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/001,196

(22) PCT Filed: Mar. 18, 2022

(86) PCT No.: PCT/CN2022/081657
§ 371 (c)(1),
(2) Date: Dec. 8, 2022

(87) PCT Pub. No.: WO2023/173399
PCT Pub. Date: Sep. 21, 2023

(65) Prior Publication Data
US 2024/0337767 A1 Oct. 10, 2024

(51) Int. Cl.
*G01V 1/30* (2006.01)
(52) U.S. Cl.
CPC .................... *G01V 1/307* (2013.01)
(58) Field of Classification Search
CPC ............ G01V 1/307; G01V 2210/63; G01V 2210/643; G01V 1/28; G01V 2210/123;
(Continued)

(56) References Cited

U.S. PATENT DOCUMENTS

| 7,924,014 B2 | 4/2011 | MacGregor et al. |
| 9,008,972 B2 | 4/2015 | Imhof et al. |

(Continued)

FOREIGN PATENT DOCUMENTS

| CN | 1873442 A | 12/2006 |
| CN | 103353610 A | 10/2013 |

(Continued)

OTHER PUBLICATIONS

Liu et al. (Common-transmission gather for direct seismic attenuation indication) (Year: 2022).*

(Continued)

*Primary Examiner* — Mohammad K Islam
(74) *Attorney, Agent, or Firm* — Osha Bergman Watanabe & Burton LLP

(57) ABSTRACT

A method of determining a presence of hydrocarbons is disclosed. The method includes obtaining a surface seismic dataset, composed of a plurality of seismic gathers, determining a redatumed gather for a target horizon based on the seismic gather, determining a time window of the redatumed gather around the target horizon, and determining a spectrum of a portion within the time window. The method further includes determining a hydrocarbon indicator based, at least in part, on an amplitude of a higher-frequency portion and lower-frequency portion of the spectrum of the plurality of seismic gathers, determining a geographic map of values of the hydrocarbon indicator from the plurality of seismic gathers, and determining a presence of hydrocarbons based, at least in part, on at least one anomalous value on the geographic map. A system including a seismic acquisition system and a seismic processor for executing the method is disclosed.

17 Claims, 10 Drawing Sheets

(58) Field of Classification Search
CPC .... G01V 1/006; G01V 2210/20; G01V 3/083; G01V 3/12
See application file for complete search history.

(56) References Cited

U.S. PATENT DOCUMENTS

| | | | |
|---|---|---|---|
| 10,365,386 B2 | 7/2019 | Albertin et al. | |
| 2004/0044479 A1* | 3/2004 | Sansone | G01V 1/28 702/16 |
| 2007/0299614 A1* | 12/2007 | Dewarrat | G01V 1/28 715/700 |
| 2008/0021656 A1* | 1/2008 | Saenger | G01V 1/28 702/16 |
| 2011/0087435 A1* | 4/2011 | Hornbostel | G01V 3/12 702/13 |
| 2018/0267187 A1 | 9/2018 | Al-Ali et al. | |
| 2020/0210846 A1 | 7/2020 | Yu | |
| 2020/0348432 A1 | 11/2020 | Sodagar | |
| 2021/0311223 A1 | 10/2021 | Roy et al. | |

FOREIGN PATENT DOCUMENTS

| | | |
|---|---|---|
| CN | 104142517 A | 11/2014 |
| CN | 107272062 A | 10/2017 |
| EP | 1664845 A2 | 6/2006 |

OTHER PUBLICATIONS

Riaz, Monitoring Heavy Oil Recovery by Integrating Seismic Data with Reservoir Simulation (Year: 2015).*

Dilay et al.; "Spectral analysis applied to seismic monitoring of thermal recovery", The Leading Edge; vol. 14; Issue 11; Nov. 1995; pp. 1099-1164 (6 pages).

Quan et al.; "Seismic attenuation tomography using the frequency shift method", Geophysics; vol. 62; No. 3; May 1997; pp. 895-905 (11 pages).

Batzle et al.; "Fluid mobility and frequency-dependent seismic velocity—Direct measurements", Geophysics; vol. 71; No. 1; Jan. 2006; pp. N1-N9 (9 pages).

Taher M. Sodagar; "Revelation of the Triassic Gas Potential with Insight of ISO Frequency Spectral Decomposition in Saudi Arabia's Offshore", SPE-172625-MS; Society of Petroleum Engineers; Mar. 2015; pp. 1-16 (16 pages).

Chapman et al.; "The influence of abnormally high reservoir attenuation on the AVO signature", The Leading Edge; vol. 24; Issue 11; Nov. 2005; pp. 1120-1125 (5 pages).

Dasgupta et al.; "Estimation of Q from surface seismic reflection data", Geophyics; vol. 63; No. 6; Nov. 1998; pp. 2120-2128 (9 pages).

Lee et al.; "Influence of tuning effect on seismic attenuation estimation", Proceedings of the 10th SEGJ International Symposium, Kyoto, Japan; Nov. 2011; pp. 163-166 (4 pages).

Sketsiou et al.; "New insights into seismic absorption imaging", Physics of the Earth and Planetary Interiors; vol. 298; Jan. 2020 (74 pages).

Hermana et al.; "The Attribute for Hydrocarbon Prediction Based on Attenuation", IOP Conf. Series: Earth and Enviromental Science; vol. 19; 2014; pp. 1-6 (6 pages).

Teo et al.; "Multifrequency Holography Using Backpropagation", Trasonic Imaging; vol. 8; Issue 3; Jul. 1986; pp. 213-224 (12 pages).

International Search Report and Written Opinion of the International Searching Authority issued in corresponding International Application No. PCT/CN2022/081657, mailed Nov. 30, 2022 (11 pages).

* cited by examiner

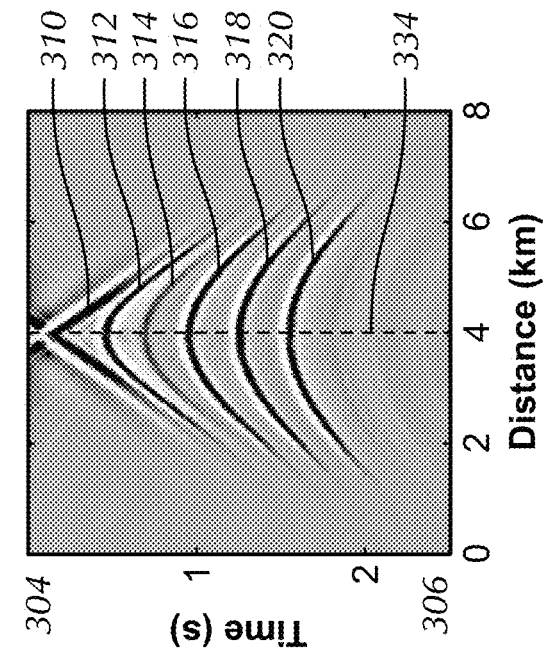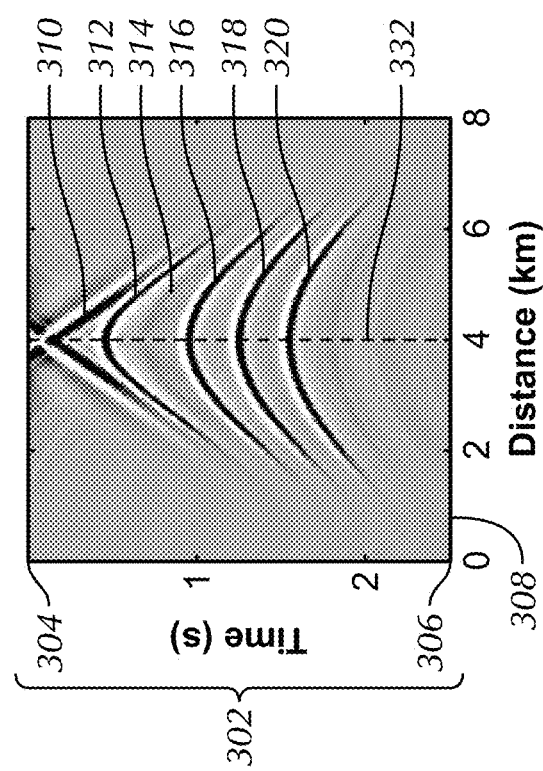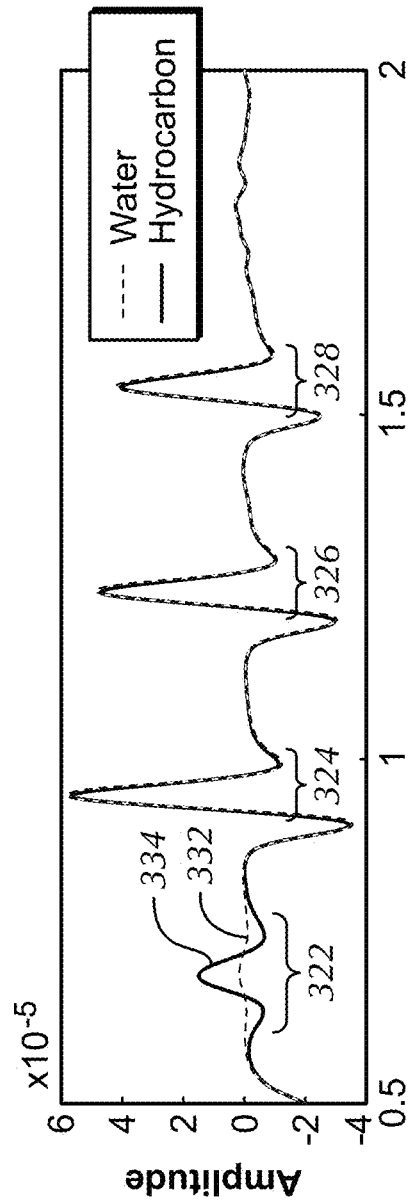
FIG. 3A
FIG. 3B
FIG. 3C

HOLOGRAPHIC INVERSION FOR HYDROCARBON INDICATOR

BACKGROUND

Surface seismic surveys produce images of subsurface geology and can be used to determine the location and size of possible hydrocarbon accumulations, such as oil and gas reservoirs. During a surface seismic survey, both the seismic source and the seismic receivers are located on the earth's surface. Seismic waves propagate through the earth's subsurface, producing a seismic record, or seismic trace, at each seismic receiver. Seismic waves are elastic vibrations or disturbances that radiate from a seismic source. A seismic source is a device that provides energy for seismic data acquisition, such as an explosive charge. A seismic trace represents a signal detected by a seismic receiver. Related seismic traces may be organized into groups, called "gathers", for the purposes of display, analysis, and processing.

It is typically necessary to process the surface seismic data to generate images of the subsurface geology and characterize the types of rocks and the fluids within the pores of the rocks.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method of determining a presence of hydrocarbons. The method includes obtaining a surface seismic dataset, composed of a plurality of seismic gathers, and, for each member of the plurality of seismic gathers, determining a redatumed gather for a target horizon based, at least in part, on the seismic gather, including a plurality of redatumed traces. The method further includes, for each member of the plurality of seismic gathers, determining a time window of the redatumed gather around the target horizon, and determining a spectrum of a portion within the time window. The method further includes determining a hydrocarbon indicator based, at least in part, on an amplitude of a higher-frequency portion of the spectrum and an amplitude of a lower-frequency portion of the spectrum of the plurality of seismic gathers. The method further includes determining a geographic map of values of the hydrocarbon indicator from the plurality of seismic gathers, and determining a presence of hydrocarbons based, at least in part, on at least one anomalous value on the geographic map.

In general, in one aspect, embodiments relate to a non-transitory computer readable medium storing instructions executable by a computer processor. The instructions include functionality for receiving a surface seismic dataset, wherein the surface seismic dataset comprises a plurality of seismic gathers, and, for each member of the plurality of seismic gathers, determining a redatumed gather for a target horizon based, at least in part, on the seismic gather, including each redatumed gather comprising a plurality of redatumed traces. For each member of the plurality of seismic gathers, the instructions further include functionality for, determining a time window of the redatumed gather around the target horizon, and determining a spectrum of a portion within the time window. The instructions further include functionality for determining a hydrocarbon indicator based, at least in part, on an amplitude of a higher-frequency portion of the spectrum and an amplitude of a lower-frequency portion of the spectrum of the plurality of seismic gathers, determining a geographic map of values of the hydrocarbon indicator from the plurality of seismic gathers; and determining a presence of hydrocarbons based, at least in part, on at least one anomalous value on the geographic map.

In general, in one aspect, embodiments relate to a system including a seismic acquisition system and a seismic processor. The seismic processor is configured to receive a surface seismic dataset, including a plurality of seismic gathers, and determine, for each member of the plurality of seismic gathers, a redatumed gather for a target horizon based, at least in part, on the seismic gather, including a plurality of redatumed traces for each redatumed gather. The seismic processor is further configured to determine, for each member of the plurality of seismic gathers, a time window of the redatumed trace around the target horizon, and determine a spectrum of a portion within the time window. The seismic processor is further configured to determine a hydrocarbon indicator based, at least in part, on an amplitude of a higher-frequency portion of the spectrum and an amplitude of a lower-frequency portion of the spectrum of the plurality of seismic gathers, determine a geographic map of values of the hydrocarbon indicator from the plurality of seismic gathers, and determine a presence of hydrocarbons based, at least in part, on at least one anomalous value on the geographic map.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIG. 3A shows a redatumed gather in accordance with one or more embodiments.

FIG. 3B shows a redatumed gather in accordance with one or more embodiments.

FIG. 3C shows a comparison of two seismic traces in accordance with one or more embodiments.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments are disclosed for performing holographic inversion to determine a hydrocarbon indicator of the presence of hydrocarbons in a portion of a subterranean reservoir. The hydrocarbon indicator is based on differences in the spectrum of seismic reflections that result from the presence of hydrocarbons rather than water or brine. Hydrocarbon-filled reservoirs produce seismic reflections with larger low frequency values and smaller high frequency values than water or brine. A high-resolution map of the hydrocarbon indicator may be generated by first backward propagating the seismic receiver wavefield to the target horizon before calculating the hydrocarbon indicator.

Figure 1:
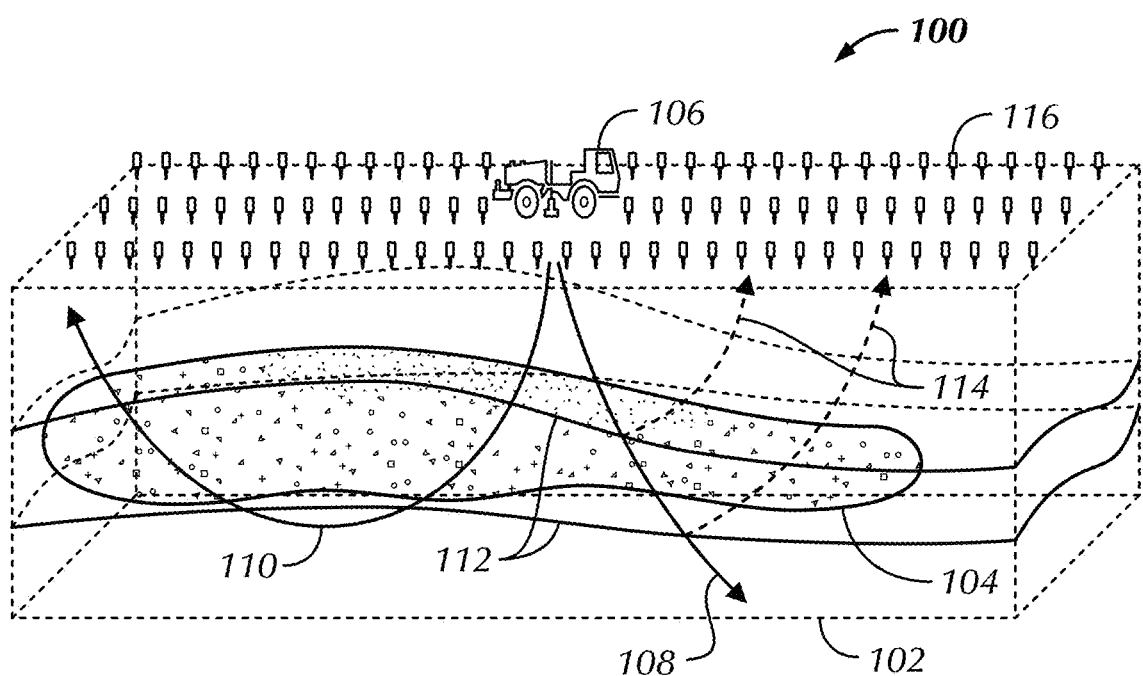
FIG. 1 depicts elements of a surface seismic survey in accordance with one or more embodiments.

FIG. 1 depicts elements of a seismic acquisition system for acquiring a surface seismic survey (100) in accordance with one or more embodiments. In a surface seismic survey (100), energy in the form of seismic waves is generated by the seismic source (106), located at the earth's surface, which may be partially reflected (114) when encountering a surface across which an impedance contrast exists, such as a target reservoir (104), which may potentially be saturated with water or hydrocarbons. Seismic waves may be subsequently detected by a seismic receiver (116), also located at the earth's surface. Reflected seismic waves are useful for mapping and evaluating subterranean regions of interest (102), including geological discontinuities (112) and target reservoirs (104) containing possible hydrocarbon accumulations. The energy contained in seismic waves may also be refracted (110), or "bent," when passing through a subsurface boundary. Seismic waves (108) may also be transmitted through subsurface layers without reflection or refraction back to the surface. These transmitted seismic waves (108) may never be detected by seismic receivers.

The amplitude of a reflection of a seismic wave from a target horizon is determined by the characteristics of the formation immediately above and immediately below the target horizon. In particular, the amplitude is determined by the seismic propagation velocity, the mass density, and the attenuation in the formation immediately above and immediately below the target horizon. The target horizon may be the upper surface of a hydrocarbon reservoir, such as an oil and gas reservoir. Hydrocarbon-saturated reservoirs may generate reflections with amplitude spectra having larger low frequency and smaller high frequency values than water-saturated or dry reservoirs.

Figure 2A:
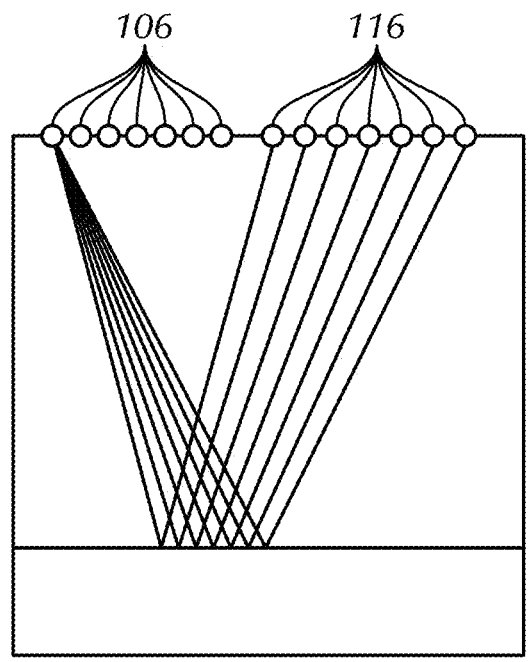
FIG. 2A depicts seismic source and seismic receiver configurations in accordance with one or more embodiments.

FIG. 2A depicts seismic source and seismic receiver configurations in accordance with one or more embodiments. During a surface seismic survey, both the seismic source (106) and the seismic receivers (116) may be located on the surface of the earth. In order to perform holographic inversion to determine a hydrocarbon indicator, a seismic gather is backward propagated, or "redatumed" to a target horizon. The backward propagation maybe performed by simulating reverse-time propagation. A seismic gather is a collection of one or more seismic traces grouped according to certain spatial coordinates, such as a common shot from a seismic source. The seismic gather includes all seismic traces recorded by seismic receivers as a result of the single shot fired from the seismic source. Reverse-time propagation of the seismic gather includes simulating the propagation of the seismic wave backward in time until it reaches a target horizon. In oil and gas exploration, the target horizon may be a subsurface region of interest, including possible hydrocarbon accumulations, such as oil and gas reservoirs.

Figure 2B:
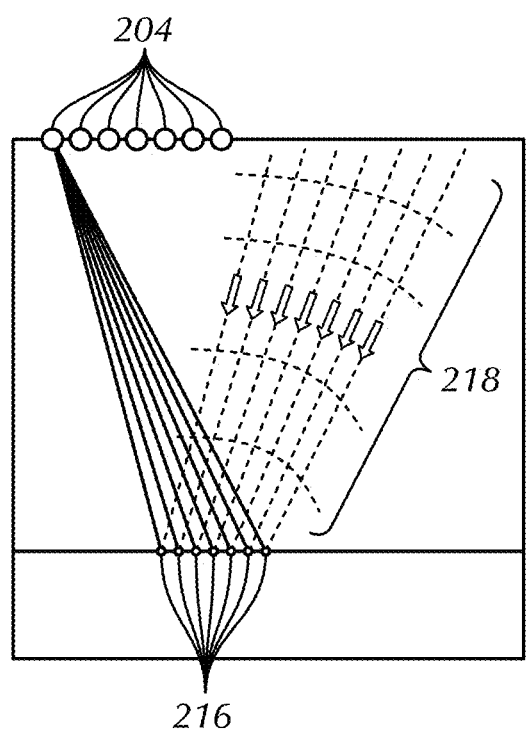
FIG. 2B depicts seismic source and seismic receiver configurations in accordance with one or more embodiments.

FIG. 2B depicts seismic source and seismic receiver configurations in accordance with one or more embodiments. In performing holographic inversion to determine a hydrocarbon indicator, the redatumed seismic source is set to the seal, or top of the target reservoir, and the seismic receivers (116) are set to the surface. In FIG. 2B, a reflected wavefield (218) is shown as though the seismic source was positioned at a depth equivalent to a reservoir seal, or top of the target reservoir. The points to which the wavefield is backward-propagated are shown as (216). Redatuming may be performed using the following equation:

$$d(x_s, t; x') = S\left[ \int G(x', -t; x_r) * u(x_r, t; x_s) dx_r \right] \quad \text{Equation (1)}$$

where G is Green's function extrapolated by two-way wave equation, the notation * represents a time convolution, $u(x_r, t; x_s)$ is the shot gather from the shot $X_s$ to the receiver $X_r$, $d(x_s, t; x')$ is the simulated redatumed shot gather from the seal x' to the surface location of $X_s$, and S represents a sorting operator.

In accordance with one or more embodiments, the sorting operator, S, may denote the application of the principle of reciprocity. The principle of reciprocity states that the same seismic trace will be recorded if the locations of the seismic source (106) and seismic receivers (116) are exchanged and the nature of the source and the receiver are reversed. For example, if the source is a vertical force and the receiver is a pressure sensor (hydrophone), then the same seismic trace will be recorded if the positions of the seismic source and seismic receiver are switched and the seismic source becomes a pressure source and the seismic receiver detects the vertical displacement. According to the principle of reciprocity, the travel time of seismic energy is unchanged by reversing the propagation direction.

Redatuming may also be performed using two-way wave equation, one-way wave equation, or asymptotic propagation modelling methods. The resulting redatumed seismic dataset provides detailed information about the subsurface region of interest, or target reservoir, due to the location of the redatumed seismic source (206) directly above the target reservoir. Seismic waves propagating from the redatumed seismic source (206) are influenced by the target reservoir directly below it.

FIG. 3A shows a redatumed gather in accordance with one or more embodiments. The redatumed gather in FIG. 3A is collected over a water-saturated target horizon. The vertical axis (302) indicates recording time increasing from a minimum recording time (304) to a maximum recording time (306). The horizontal axis (308) indicates the horizontal position of the seismic receiver, monotonically increasing from the minimum offset to the left to the maximum offset to the right, with the seismic source (106) located at 4 km. Six reflection, or "events" (310-320) are shown in the redatumed gather depicted in FIG. 3A. The first two events (310, 312) are generated at reflections above the horizon of interest and may be muted.

FIG. 3B shows a redatumed gather in accordance with one or more embodiments. The redatumed gather in FIG. 3B is collected over a hydrocarbon-saturated target horizon. Six events (310-320) are shown in the redatumed gather. The first two events (310, 312) are not directly relevant in providing information regarding the subsurface region of interest. The subsequent events (314-320) are reflection events that provide key information about the regarding the subsurface region of interest. The holographic inversion serves to backward-propagate, or redatum, a gather to the target horizon depth within a subsurface region of interest.

FIG. 3C shows a comparison of two seismic traces in accordance with one or more embodiments. The trace (332) is extracted from the center of FIG. 3A and shows the response of a water-saturated target formation. The trace (334) is extracted from the center of FIG. 3B and shows the response of a hydrocarbon saturated formation.

Hydrocarbon-saturated reservoirs generally show strong attenuation, while water-saturated reservoirs generally do not. Attenuation describes the loss of energy, or amplitude, of seismic waves as they pass through a medium. Attenuation may be a frequency-dependent attribute. High frequency seismic waves may attenuate more rapidly over distance than low frequency seismic waves. This energy loss occurs through absorption, reflection, and refraction at surfaces where an impedance contrast exists.

In accordance with one or more embodiments, the difference in attenuation between a hydrocarbon-saturated reservoir and a water-saturated reservoir in FIG. 3C may be observed within horizon 322, which shows a strong difference in attenuation, illustrated as deviations from zero between the dashed line and solid line. Horizons 324, 326, and 328 show little difference in attenuation.

Figure 4:
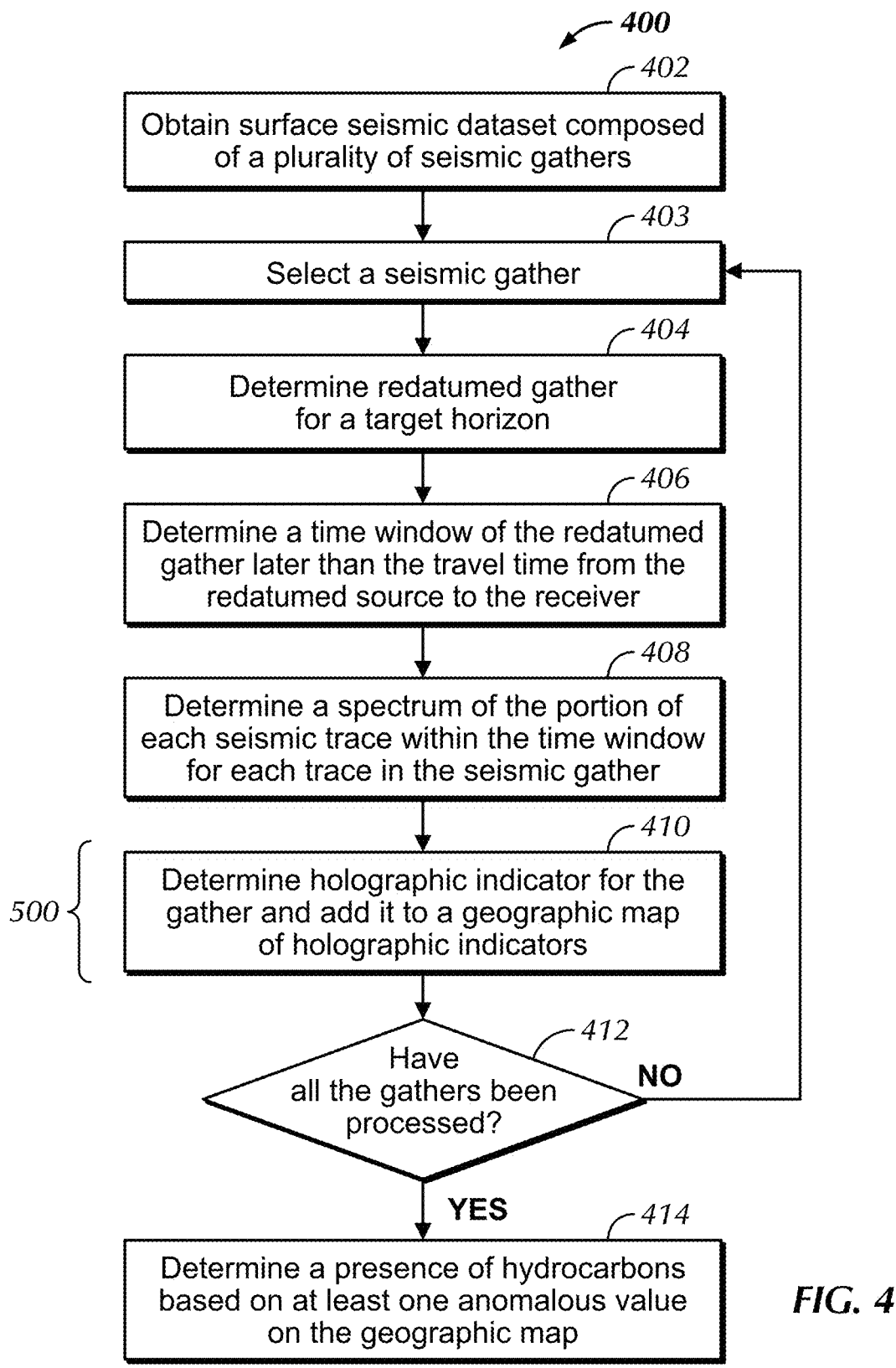
FIG. 4 shows a flowchart of the process of holographic inversion for determining a hydrocarbon indicator and presence of hydrocarbons in accordance with one or more embodiments.

FIG. 4 shows a flowchart (400) of the process of holographic inversion for determining a hydrocarbon indicator of the presence of hydrocarbons using holographic inversion, in accordance with one or more embodiments. In Step 402, in accordance with one or more embodiments, a surface seismic dataset is obtained. The surface seismic dataset may include a plurality of seismic gathers. The seismic gathers may be common-source gathers.

In Step 403, a gather may be selected from the surface seismic dataset. The gathers may be selected in any order without departing form the scope of the invention. For example, in accordance with some embodiments the gathers may be selected based on the surface location of the source or the order in which they were recorded. In other embodiments the gathers may be selected randomly.

In Step 404, the selected gather is redatumed to a target horizon within the subsurface region of interest. The redatuming may be performed by simulating the backward propagation in time of the recorded seismic waves into the subsurface. The simulated backward propagation maybe performed using a computer processor and any one of a number of seismic wave propagation algorithms familiar to a person of ordinary skill in the art without departing form the scope of the invention. For example, the backward propagation may be performed using a time-domain finite-difference solution to the two-way wave acoustic wave equation or using a frequency-wavenumber solution to the one-way elastic wave equation.

In Step 406, a time window of the redatumed gather may selected. In accordance with one or more embodiments the time window may include the seismic reflection from one or more seismic reflectors deeper than the target horizon. A travel time for seismic waves from the redatumed source to the receiver gather may be calculated and a time window starting at this travel time and extending for a predetermined duration later than the travel time may be selected.

In Step 408, a spectrum of a portion of the seismic trace within the designated time window may be determined. The spectrum may be determined using any method familiar to a person of ordinary skill in the art without departing from the scope of the invention For example, the spectrum may be determined using spectral decomposition employing, without limitation, a short-time Fourier transform, a Gabor transform, or a harmonic wavelet transform.

In accordance with one or more embodiments, in Step 410, the hydrocarbon indicator may be determined from the muted redatumed gather. The hydrocarbon indicator for the selected gather is added to a geographic map of hydrocarbon indicators. Step 410 is described in greater detail below and in FIG. 5.

In Step 412, if all the gathers contained in the surface seismic dataset have been processed using Steps 402 through 410, the workflow continues to Step 414. In Step 412, if all the gathers contained in the surface seismic dataset have not yet been processed using Steps 402 through 410, the workflow may return to Step 403 to select another gather.

In accordance with one or more embodiments, in Step 414 a geographic map of combined hydrocarbon indicators may be used to evaluate the target reservoir and determine if hydrocarbons are present. The presence of hydrocarbons may be determined based on at least one anomalous value on the geographic map of hydrocarbon indicator values. For example, an anomalous value may be a value that is greater than a predetermined value, or a value greater by a predetermined amount than a mean of all the hydrocarbon indicator values over the target horizon.

Figure 5:
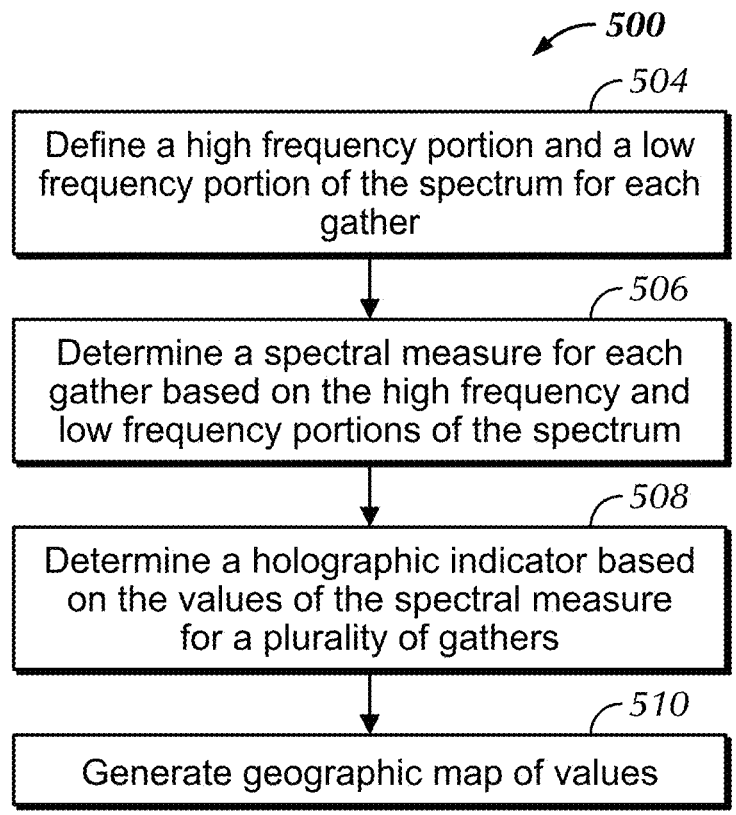
FIG. 5 shows a flowchart in accordance with one or more embodiments.

FIG. 5 shows a flowchart (500) describing Step 410 of FIG. 4 in greater detail, in accordance with one or more embodiments. The input data for the flowchart (500) is the spectrum of a portion of each seismic trace within a time window encompassing a target horizon for a redatumed gather.

In Step 504, in accordance with one or more embodiments, a high frequency portion and a low frequency portion of the spectrum for each gather may be defined. In Step 506, a spectral measure for each gather may be determined based on the high frequency portion and a low frequency portion of the spectrum. The spectral measure for each gather may be determined by computing the frequency spectrum ratio (FSR), centroid frequency (CF).

In accordance with one or more embodiments, FSR values may be computed as:

$$FSR = \frac{\sum_{f=f_3}^{f_4} A(f)}{\sum_{f=f_1}^{f_2} A(f)},\quad \text{Equation (2)}$$

where A (f) is the frequency-domain amplitude spectrum, limits of integration $f_1$, $f_2$, $f_3$, and $f_4$ indicate the range from low and high frequency bands, and $f_1 < f_2 \le f_3 < f_4$. Low FSR values are associated with hydrocarbon-saturated reservoirs.

High FSR values are associated with dry reservoirs or water-saturated reservoirs. In accordance with one or more embodiments, CF values may be computed as:

$$CF = \frac{\sum_{f=0}^{fmax} fA(f)}{\sum_{f=0}^{fmax} A(f)}.\quad \text{Equation (3)}$$

Low CF values are associated with hydrocarbon-saturated reservoirs. High CF values are associated with dry reservoirs or water-saturated reservoirs. FSR and CF decreases as the attenuation increases. In other words, FSR and CF are inversely proportional to the attenuation.

In accordance with other embodiments, other spectral measures familiar to a person of ordinary skill in the art to compare a high frequency portion of the spectrum and a low frequency portion of the spectrum may be used without departing from the scope of the invention.

In Step 508, in accordance with one or more embodiments, a hydrocarbon indicator, R, based on the sum of the spectral measures, SM, for many gathers may be computed as:

$$R(x_s) = \frac{1}{N(x_s)} \sum_{x_r} SM(x, x_r; x_s) \quad \text{Equation (4)}$$

where, N is the number of source locations $x_s$ summed over, and x represents the location within the geographic map of the hydrocarbon indicator. The SM may be the FSR, the CF, or a combination of the FSR and the CR without departing from the scope of the invention.

In Step 510, in accordance with one or more embodiments, a geographic map may be generated based on of the values of the hydrocarbon indicator derived from the plurality of seismic traces. In some embodiments, anomalously low values may be associated with hydrocarbon-saturated reservoirs or portions of the reservoir and high values may be associated with water-saturated portions of the reservoir or a dry reservoir. In other embodiments, anomalously high values of the hydrocarbon indicator may be interpreted as an indication of hydrocarbon presence beneath the target horizon.

Figure 6:
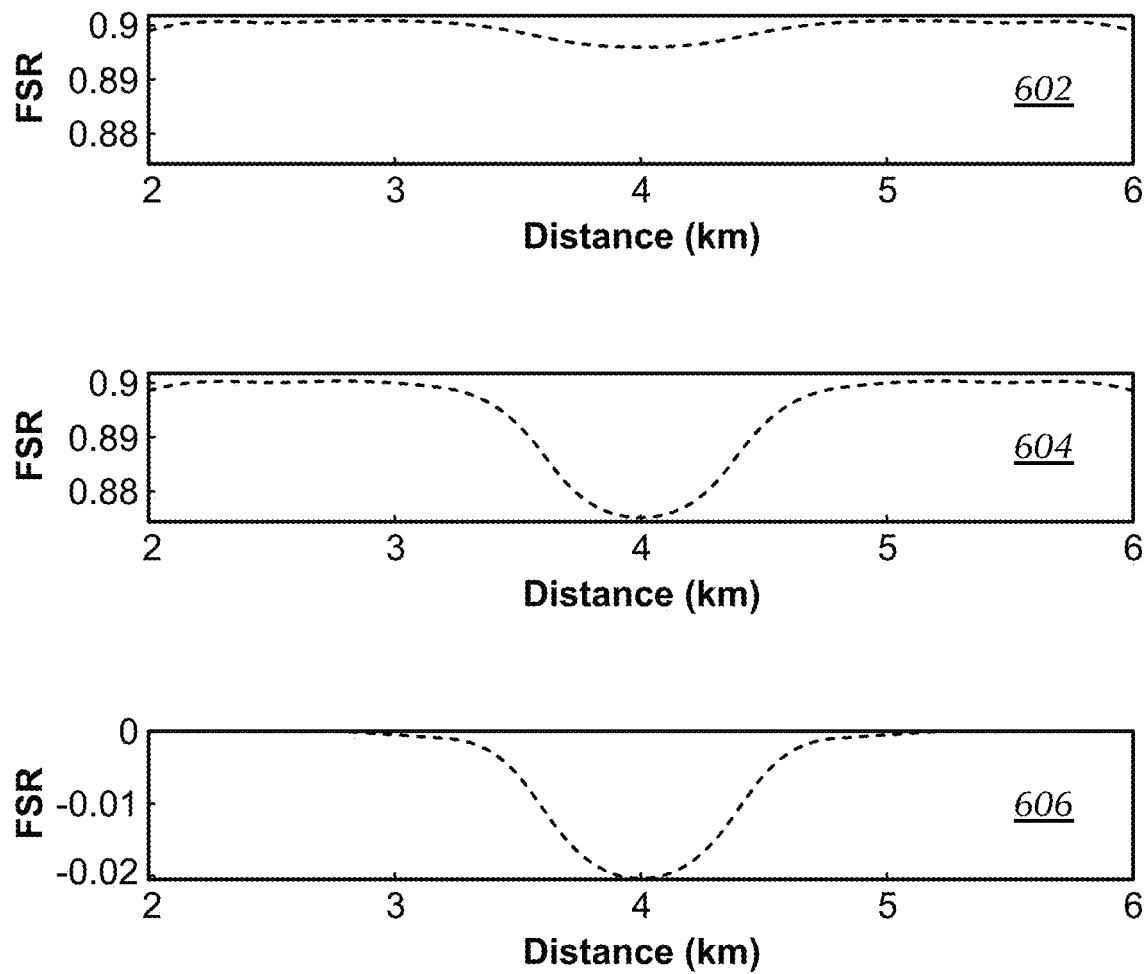
FIG. 6 shows a reservoir attenuation prediction in accordance with one or more embodiments.

FIG. 6 shows a comparison of hydrocarbon indicator values for a hydrocarbon reservoir with low attenuation (602), high attenuation (604), and the difference between the two (606). In each case, the FSR value obtained from seismic data acquired above and to either side of the hydrocarbon reservoir.

Figure 7A:
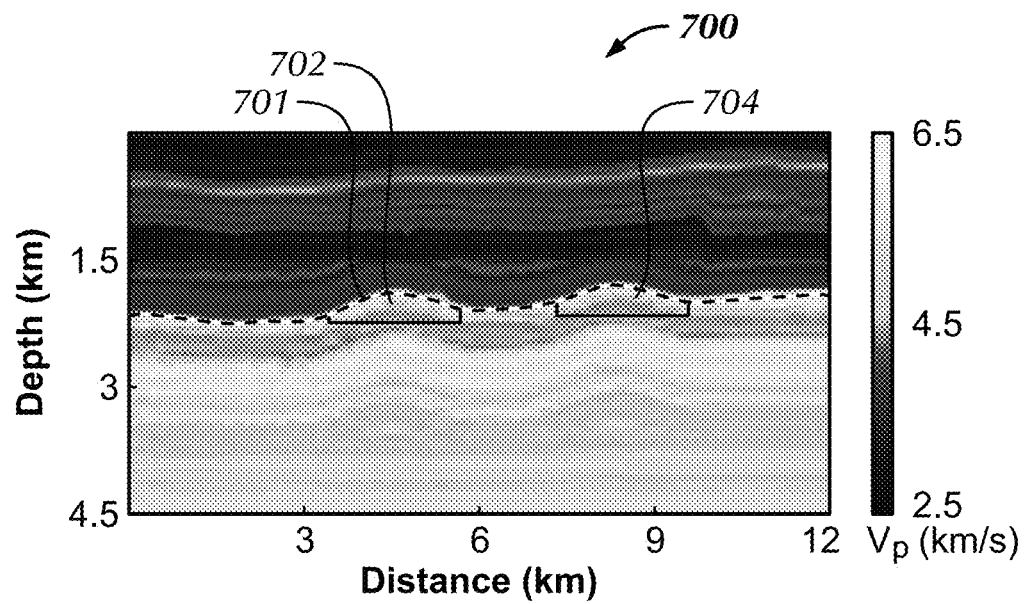
FIG. 7A depicts a synthetic velocity model in accordance with one or more embodiments.

FIGS. 7A, 7B, 8A, and 8B show a synthetic example to illustrate one embodiment. FIG. 7A depicts a synthetic velocity model. The dashed white line (701) indicates the seal of a reservoir composed of two anticlines. The velocity model has a realistic complex structure with many thin layers.

Figure 7B:
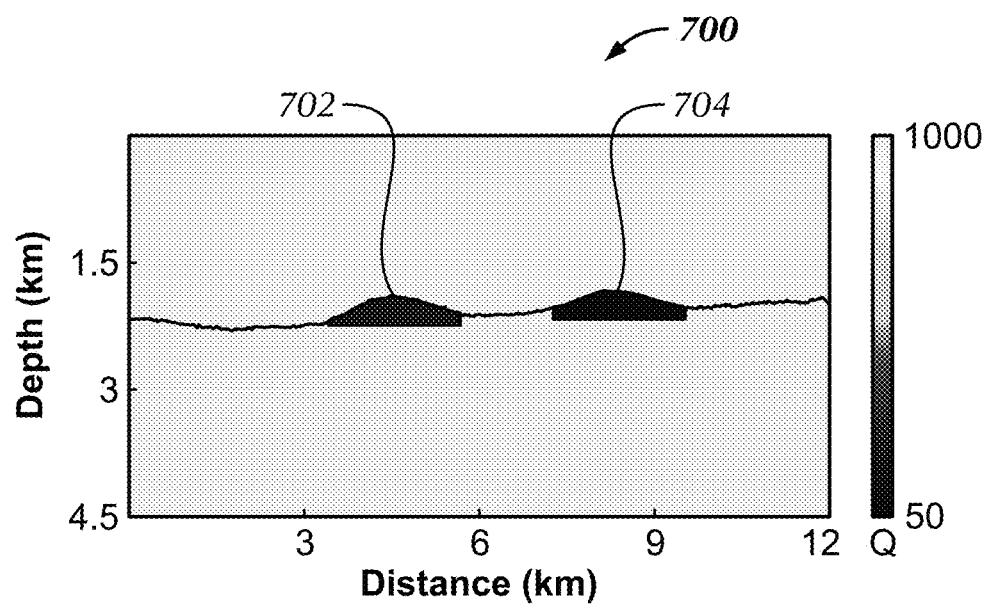
FIG. 7B depicts a synthetic attenuation model in accordance with one or more embodiments.

FIG. 7B depicts a corresponding synthetic attenuation model. The left reservoir (702) is specified to be a water saturated reservoir with a Q factor of 200. The right reservoir (704) is specified to be a hydrocarbon saturated reservoir with a Q factor of 50.

Synthetic seismic data are simulated using the model using a 2D visco-acoustic finite-difference method. The 400 seismic source locations are uniformly from 0-12 kilometers along the surface with spacing of 30 meters. Seismic receiver (116) arrays cover the entire surface at a spacing of 15 meters.

Figure 8A:
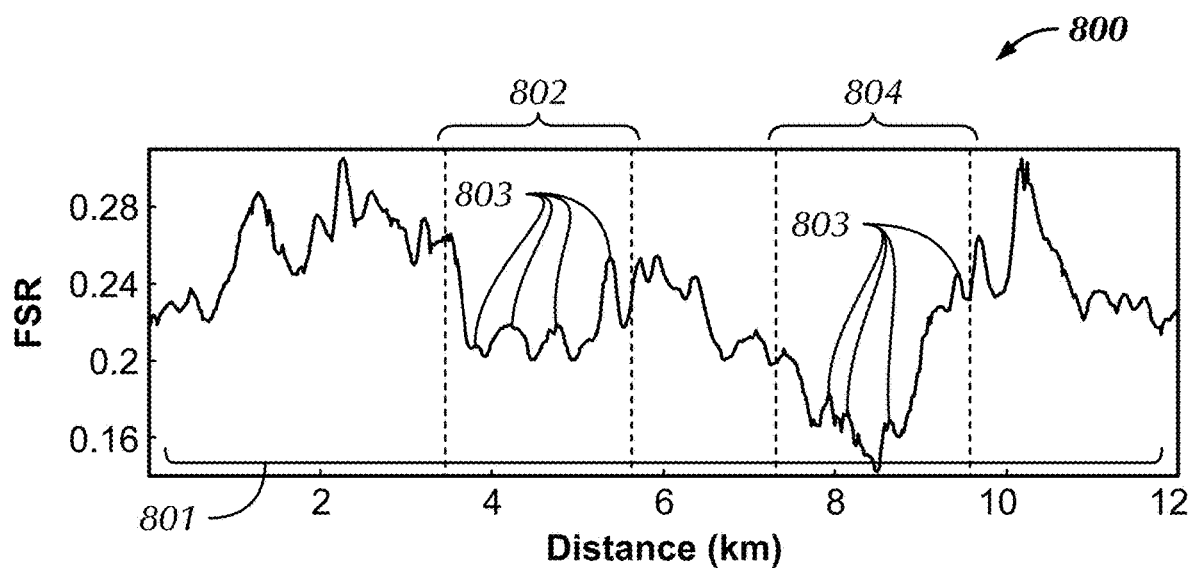
FIG. 8A shows a hydrocarbon indicator in accordance with one or more embodiments.

FIG. 8A shows a hydrocarbon indicator (801) in accordance with one or more embodiments. The areas marked by the dashed lines denote the left reservoir (802) and right reservoir (804). The hydrocarbon indicator displays low value above the hydrocarbon saturated reservoir (804) and a higher value at the reservoir containing water (802). The hydrocarbon indicator also shows oscillations (803) not associated with the presence of hydrocarbons. This oscillation may be related to the tuning effect of the thin layers and the strong interference of extrapolated wavefields due to the high complexity of the model.

Figure 8B:
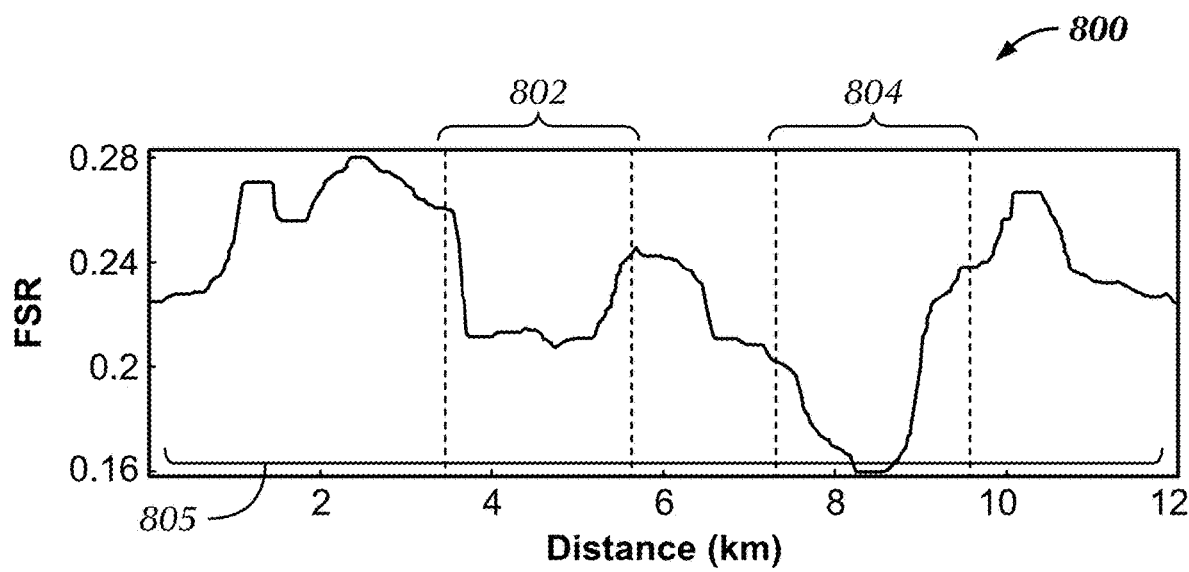
FIG. 8B shows a hydrocarbon indicator in accordance with one or more embodiments.

FIG. 8B shows a hydrocarbon indicator (805) in accordance with one or more embodiments. The hydrocarbon indicator (805) has been determined from the hydrocarbon indicator (801) displayed in FIG. 8A by applying a median filter to remove the oscillations. The filtered hydrocarbon indicator (805) clearly distinguishes the hydrocarbons saturated reservoir (804) from the water saturated reservoir (802).

Figure 9:
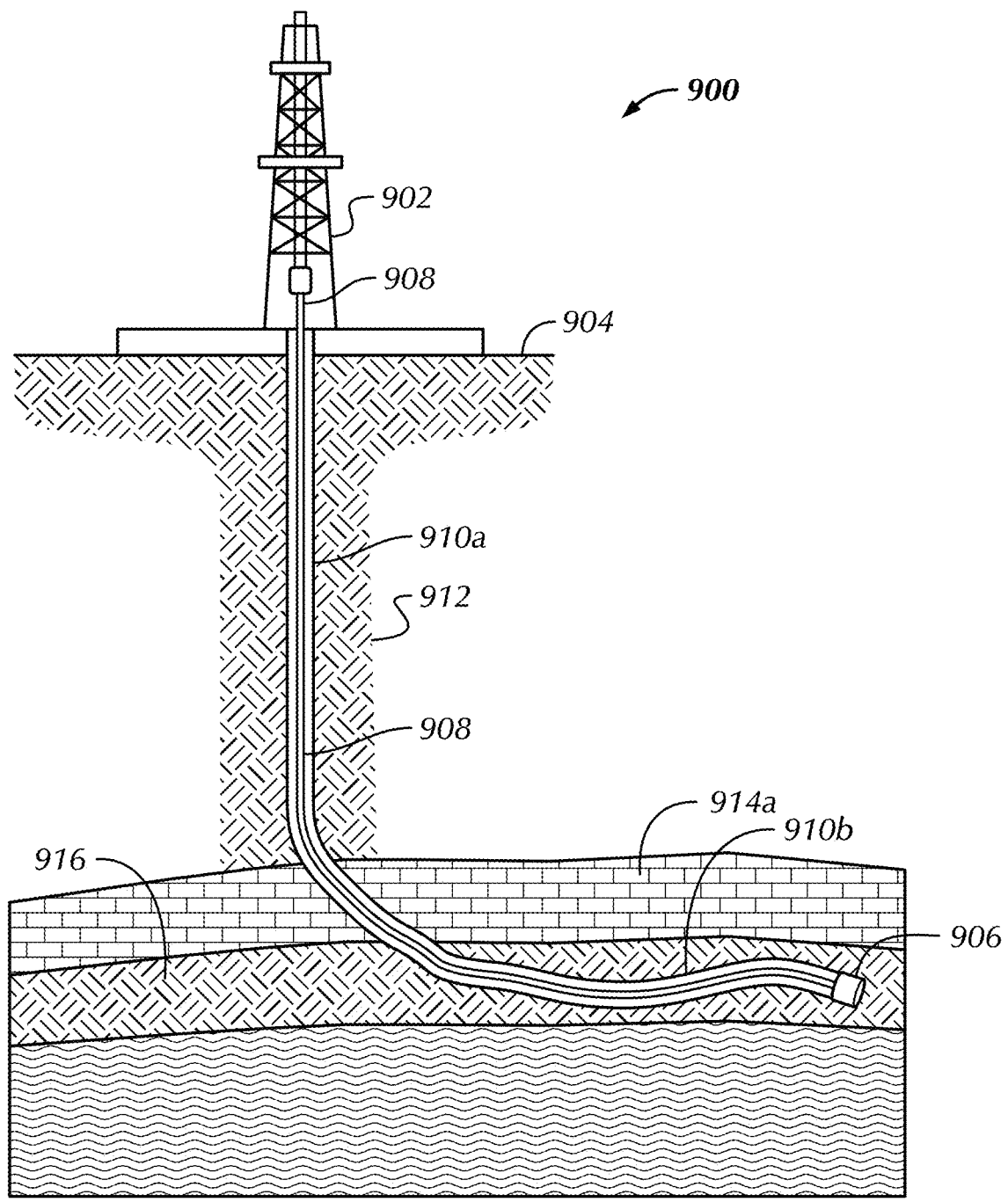
FIG. 9 depicts a drilling system in accordance with one or more embodiments.

FIG. 9 shows a drilling system (900) in accordance with one or more embodiments. The drilling system (900) may include a derrick (902). In some embodiments, the derrick (902) may be located on the land surface (904). In other embodiments, the derrick may be located on a jack-up drill rig (not shown), or a floating drill rig (not shown), on a drill ship (not shown). A drill bit (906) suspended by a drill string (906) from the derrick (902) may drill a wellbore (910a, 910b) through the subsurface. In accordance with one or more embodiments, the wellbore trajectory may be vertical (910a), highly deviated or horizontal (910b), or a combination of vertical wellbore portions (910a) and highly deviated or horizontal wellbore portions (910b). The wellbore (910a, 910b) may traverse a plurality of overburden layers (912) and one or more cap-rock layers (914). The wellbore (910a, 910b) may penetrate one or more hydrocarbon-saturated reservoirs (916). Furthermore, the wellbore trajectory may be planned and drilled, based at least in part, on the geographic map of the hydrocarbon indicator. The drilled wellbore (910a, 910b) may produce hydrocarbons from the hydrocarbon-saturated reservoir.

Figure 10:
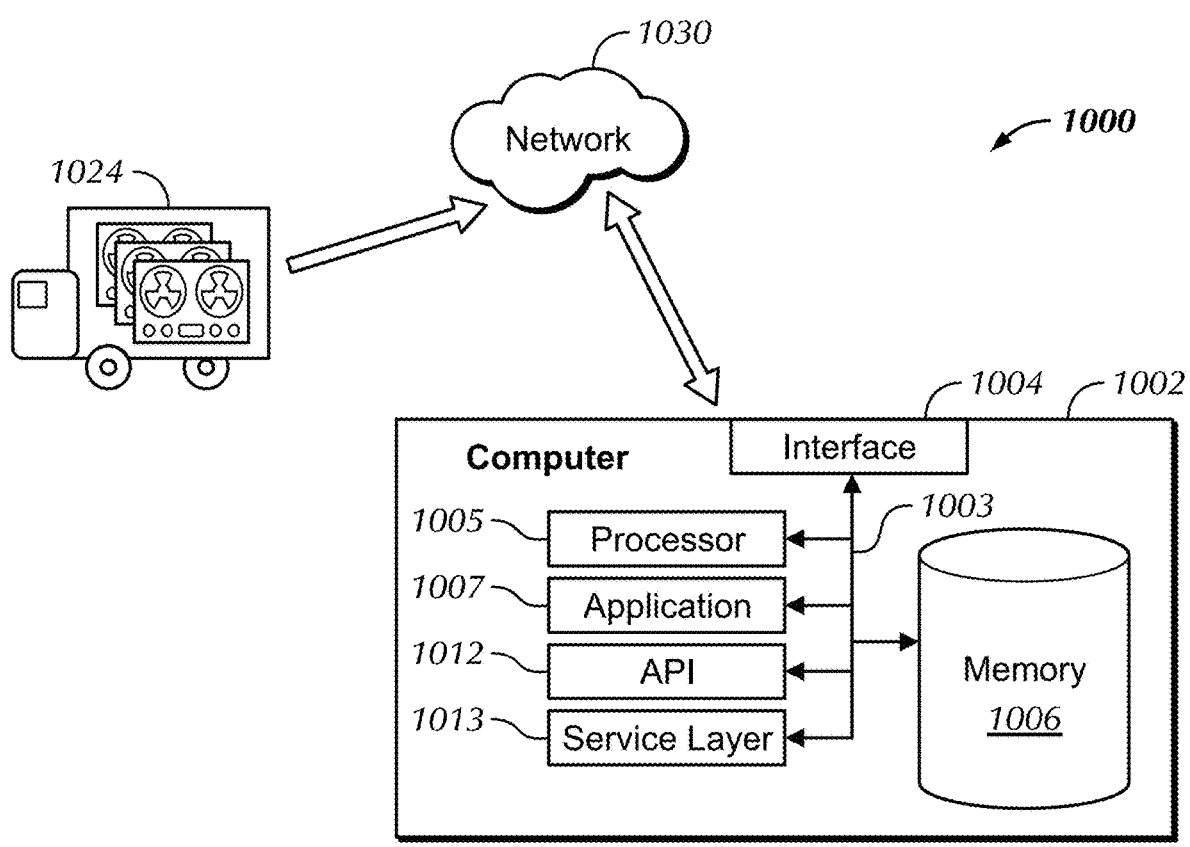
FIG. 10 depicts a system in accordance with one or more embodiments.

FIG. 10 shows a system in accordance with one or more embodiments. The system may further include a seismic recording facility (1024) for recording the surface seismic dataset recorded by the surface seismic survey (100) and a seismic processor (1020) that may be located in the seismic recording facility (1024) or may be located at a location remote from the surface seismic survey (100) and connected to the seismic recording facility (1024) by a network (1030). The seismic processor (1002) may be a computer system configured to process a surface seismic dataset to determine the hydrocarbon indicator (510) of the redatumed seismic dataset.

FIG. 10 further depicts a block diagram of the computer system (1002) used to provide computational functionalities associated with described algorithms, methods, functions, processes, flows, and procedures as described in this disclosure, according to one or more embodiments. The illustrated computer (1002) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1002) may include a computer that includes an input device, such as a keypad, keyboard, touch screen, or other device that can accept user information, and an output device that conveys information associated with the operation of the computer (1002), including digital data, visual, or audio information (or a combination of information), or a Graphical User Interface (GUI).

The computer (1002) can serve in a role as a client, network component, a server, a database or other persistency, or any other component (or a combination of roles) of a computer system for performing the subject matter described in the instant disclosure. The illustrated computer (1002) is communicably coupled with a network (1030). In some implementations, one or more components of the computer (1002) may be configured to operate within environments, including cloud-computing-based, local, global, or other environment (or a combination of environments).

At a high level, the computer (1002) is an electronic computing device operable to receive, transmit, process, store, or manage data and information associated with the described subject matter. According to some implementations, the computer (1002) may also include or be communicably coupled with an application server, e-mail server, web server, caching server, streaming data server, business intelligence (BI) server, or other server (or a combination of servers).

The computer (1002) can receive requests over network (1030) from a client application (for example, executing on another computer (1002)) and responding to the received requests by processing the said requests in an appropriate software application. In addition, requests may also be sent to the computer (1002) from internal users (for example, from a command console or by other appropriate access method), external or third-parties, other automated applications, as well as any other appropriate entities, individuals, systems, or computers.

Each of the components of the computer (1002) can communicate using a system bus (1003). In some implementations, any or all of the components of the computer (1002), both hardware or software (or a combination of hardware and software), may interface with each other or the interface (1004) (or a combination of both) over the system bus (1003) using an application programming interface (API) (1012) or a service layer (1013) (or a combination of the API (1012) and service layer (1013). The API (1012) may include specifications for routines, data structures, and object classes. The API (1012) may be either computer-language independent or dependent and refer to a complete interface, a single function, or even a set of APIs. The service layer (1013) provides software services to the computer (1002) or other components (whether or not illustrated) that are communicably coupled to the computer (1002). The functionality of the computer (1002) may be accessible for all service consumers using this service layer. Software services, such as those provided by the service layer (1013), provide reusable, defined business functionalities through a defined interface. For example, the interface may be software written in JAVA, C++, or other suitable language providing data in extensible markup language (XML) format or another suitable format. While illustrated as an integrated component of the computer (1002), alternative implementations may illustrate the API (812) or the service layer (1013) as stand-alone components in relation to other components of the computer (1002) or other components (whether or not illustrated) that are communicably coupled to the computer (1002). Moreover, any or all parts of the API (1012) or the service layer (1013) may be implemented as child or sub-modules of another software module, enterprise application, or hardware module without departing from the scope of this disclosure.

The computer (1002) includes an interface (1004). Although illustrated as a single interface (1004) in FIG. 10, two or more interfaces (1004) may be used according to particular needs, desires, or particular implementations of the computer (1002). The interface (1004) is used by the computer (1002) for communicating with other systems in a distributed environment that are connected to the network (1030). Generally, the interface (1004) includes logic encoded in software or hardware (or a combination of software and hardware) and operable to communicate with the network (1030). More specifically, the interface (1004) may include software supporting one or more communication protocols associated with communications such that the network (1030) or interface's hardware is operable to communicate physical signals within and outside of the illustrated computer (1002).

The computer (1002) includes at least one computer processor (1005). Although illustrated as a single computer processor (1005) in FIG. 10, two or more processors may be used according to particular needs, desires, or particular implementations of the computer (1002). Generally, the computer processor (1005) executes instructions and manipulates data to perform the operations of the computer (1002) and any algorithms, methods, functions, processes, flows, and procedures as described in the instant disclosure.

The computer (1002) also includes a memory (1006) that holds data for the computer (1002) or other components, such as computer executable instructions, (or a combination of both) that can be connected to the network (1030). The memory (1006) may be non-transitory computer readable memory. For example, memory (1006) can be a database storing data consistent with this disclosure. Although illustrated as a single memory (1006) in FIG. 10, two or more memories may be used according to particular needs, desires, or particular implementations of the computer (1002) and the described functionality. While memory (1006) is illustrated as an integral component of the computer (1002), in alternative implementations, memory (1006) can be external to the computer (1002).

The application (1007) is an algorithmic software engine providing functionality according to particular needs, desires, or particular implementations of the computer (1002), particularly with respect to functionality described in this disclosure. For example, application (1007) can serve as one or more components, modules, applications, etc. Further, although illustrated as a single application (1007), the application (1007) may be implemented as multiple applications (1007) on the computer (1002). In addition, although illustrated as integral to the computer (1002), in alternative implementations, the application (1007) can be external to the computer (1002).

There may be any number of computers (1002) associated with, or external to, a computer system containing computer (1002), wherein each computer (1002) communicates over network (1030). Further, the term "client," "user," and other appropriate terminology may be used interchangeably as appropriate without departing from the scope of this disclosure. Moreover, this disclosure contemplates that many users may use one computer (1002), or that one user may use multiple computers (1002).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112 (f) for any limitations of any of the claims herein, except for those in which the claim expressly uses the words "means for" or "step for" together with an associated function.

What is claimed is:

1. A method of determining a presence of hydrocarbons, comprising:
   obtaining a surface seismic dataset,
      wherein the surface seismic dataset comprises a plurality of seismic gathers; for each member of the plurality of seismic gathers, using a computer processor:
      determining a redatumed gather for a target horizon based, at least in part, on the seismic gather,
      wherein each redatumed gather comprises a plurality of redatumed traces,
      determining a time window of the redatumed gather around the target horizon, and determining a spectrum of a portion within the time window,
   determining a hydrocarbon indicator based, at least in part, on an amplitude of a higher-frequency portion of the spectrum and an amplitude of a lower-frequency portion of the spectrum of the plurality of seismic gathers;
   determining, using the computer processor, a geographic map of values of the hydrocarbon indicator from the plurality of seismic gathers;
   determining, using the computer processor, a presence of hydrocarbons based, at least in part, on at least one anomalous value on the geographic map;
   planning a wellbore trajectory based, at least in part, on the map of the hydrocarbon indicator; and
   drilling the wellbore trajectory.

2. The method of claim 1,
   wherein determining the redatumed gather comprises simulating a reverse-time propagation of the seismic gather to a depth of the target horizon.

3. The method of claim 2,
   wherein simulating the reverse-time propagation comprises solving a two-way wave propagation equation.

4. The method of claim 1,
   wherein determining the hydrocarbon indicator comprises:
   determining a ratio of the higher-frequency portion of the spectrum to the lower-frequency portion of the spectrum; and
   determining a centroid frequency.

5. The method of claim 1,
   wherein interpreting anomalous values comprises interpreting values that are greater, by a predetermined amount, than a mean of all of the hydrocarbon indicator values over the target horizon.

6. The method of claim 5,
   wherein determining a geographic map of the values of the hydrocarbon indicator comprises determining a sum of the hydrocarbon indicator over a plurality of seismic gathers.

7. A non-transitory computer readable medium storing instructions executable by a computer processor, the instructions comprising functionality for:
   receiving a surface seismic dataset,
      wherein the surface seismic dataset comprises a plurality of seismic gathers;
   for each member of the plurality of seismic gathers:
   determining a redatumed gather for a target horizon based, at least in part, on the seismic gather,
      wherein each redatumed gather comprises a plurality of redatumed traces,
   determining a time window of the redatumed gather around the target horizon,
   determining a spectrum of a portion within the time window, and
   determining a hydrocarbon indicator based, at least in part, on an amplitude of a higher-frequency portion of the spectrum and an amplitude of a lower-frequency portion of the spectrum of the plurality of seismic gathers;
   determining a geographic map of values of the hydrocarbon indicator from the plurality of seismic gathers;
   determining a presence of hydrocarbons based, at least in part, on at least one anomalous value on the geographic map;
   planning a wellbore trajectory based, at least in part, on the map of the hydrocarbon indicator; and
   drilling the wellbore trajectory.

8. The non-transitory computer readable medium of claim 7,
   wherein determining the redatumed gather comprises simulating reverse-time propagation of the seismic gather to a depth of the target horizon.

9. The non-transitory computer readable medium of claim 7,
   wherein simulating reverse-time propagation comprises solving a two-way wave propagation equation.

10. The non-transitory computer readable medium of claim 7,
    wherein determining the hydrocarbon indicator comprises:
    determining a ratio of the higher-frequency portion of the spectrum to the lower-frequency portion of the spectrum; and
    determining a centroid frequency.

11. The non-transitory computer readable medium of claim 7,
    wherein interpreting anomalous values comprises interpreting values that are greater, by a predetermined amount, than a mean of all of the hydrocarbon indicator values over the target horizon.

12. The non-transitory computer readable medium of claim 11,
    wherein determining a geographic map of the values of the hydrocarbon indicator comprises determining a sum of the hydrocarbon indicator over a plurality of seismic gathers.

13. A system comprising:
a seismic acquisition system; and
a seismic processor configured to:
receive a surface seismic dataset,
wherein the surface seismic dataset comprises a plurality of seismic gathers, for each member of the plurality of seismic gathers:
determine a redatumed gather for a target horizon based, at least in part, on the seismic gather,
wherein each redatumed gather comprises a plurality of redatumed traces;
determine a time window of the redatumed gather around the target horizon;
determine a spectrum of a portion within the time window;
determining a hydrocarbon indicator based, at least in part, on an amplitude of a higher-frequency portion of the spectrum and an amplitude of a lower-frequency portion of the spectrum of the plurality of seismic gathers;
determine a geographic map of values of the hydrocarbon indicator from the plurality of seismic gathers;
determine a presence of hydrocarbons based, at least in part, on at least one anomalous value on the geographic map;
planning a wellbore trajectory based, at least in part, on the map of the hydrocarbon indicator; and
drilling the wellbore trajectory.

14. The system of claim 13,
wherein determining the redatumed gather comprises simulating reverse-time propagation of the seismic gather to a depth of the target horizon.

15. The system of claim 13,
wherein simulating reverse-time propagation comprises solving a two-way wave propagation equation.

16. The system of claim 13,
wherein determining the hydrocarbon indicator comprises:
determining a ratio of the higher-frequency portion of the spectrum to the lower-frequency portion of the spectrum; and
determining a centroid frequency.

17. The system of claim 13,
wherein interpreting anomalous values comprises interpreting values that are greater, by a predetermined amount, than a mean of all of the hydrocarbon indicator values over the target horizon.

* * * * *